July 25, 1950 G. E. GUY 2,516,565

PHONOGRAPH REPRODUCING ARM

Filed March 30, 1948 2 Sheets-Sheet 1

Inventor:
Glen E. Guy,
by Merton D Moore
His Attorney.

PHONOGRAPH REPRODUCING ARM

Filed March 30, 1948 2 Sheets-Sheet 2

Inventor:
Glen E. Guy,
by Merton D. Moore
His Attorney.

Patented July 25, 1950

2,516,565

UNITED STATES PATENT OFFICE 2,516,565

PHONOGRAPH REPRODUCING ARM

Glen E. Guy, Shaker Heights, Ohio, assignor to General Electric Company, a corporation of New York Application March 30, 1948, Serial No. 17,969

3 Claims. (Cl. 274—23)

This invention relates to sound reproducing devices for records of the disc type, and more particularly to an improved reproducing or tone arm for use in such devices.

It is an object of this invention to provide an improved tone arm, which is so arranged that undesirable angular variation of the phonograph needle along successive sound grooves of the record is obviated, and substantially distortionless sound reproduction is thereby attained.

It is a further object of this invention to provide a tone arm wherein the reproducing head which carries the phonograph needle is always disposed with its longitudinal axis in a plane tangential to the record grooves along successive convolutions of the record, the needle being shifted in a direction normal to the sound grooves of the record to reduce to zero the component of motion of the needle in the direction of the sound groove and obviate distortion and unpleasant noise in the reproduced sound.

Yet another object of this invention is to provide a tone arm in which the reproducing head is always disposed tangential to the sound grooves of the record, and the disposition of the needle associated with the head is therefore such that wear of the record is substantially reduced.

The features of this invention which are believed to be new are set forth with particularity in the appended claims. The invention itself, however, together with further objects and advantages thereof may best be understood by reference to the accompanying drawings wherein Figs. 1, 2, 4, 6 and 9 are diagrams useful for a clear understanding of the principles of the present invention, Figs. 3, 5, 7, 8, 10 and 11 show various embodiments of the proposed invention.

Figures 1, 2, 3, 4:
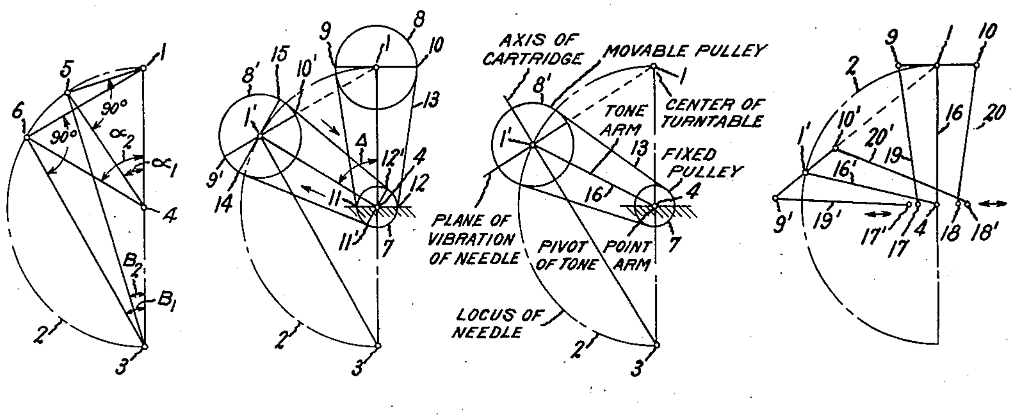

Reference is now made to Fig. 1, wherein there is shown a semi-circle 1—2—3 having a center 4. Two points on the circumference 1—2—3 are designated as 5 and 6, and these points are joined to points 1, 4 and 3, as shown. It can be demonstrated geometrically that the angles 1—5—3 and 1—6—3 are right angles, and also that the angle $\alpha_1$ is twice as great as the angle $\beta_1$ and that the angle $\alpha_2$ is twice as great as the angle $\beta_2$.

When the above-described construction is applied to the problem of a phonograph pick-up, point 1 becomes the center of the turntable, point 4 becomes the pivot point of the tone arm, arc 2 is the locus of the needle and point 3 is an imaginary focus point. When the tone arm, which extends from pivot 4 to any point on arc 2, has a position, for example, 4—5, and the longitudinal axis of the reproducer head lies along the line 3—5, the axis of the head is normal to the line 1—5 and is therefore tangential to the sound groove in the record. This relationship holds true for any other point along the arc 2.

The above indicates that when the tone arm and the reproducer head are so mounted that the head turns with respect to the tone arm, and a linkage is set up between the two, so that the head is turned with an angular speed equal to one-half that of the tone arm, since $\alpha_1$ equals $2\beta_1$, the pick-up head maintains a true tangent with respect to the sound grooves of the record, which is the result desired.

One arrangement for accomplishing the above desired result is shown in Fig. 2, wherein the head is turned with respect to the tone arm at such a rate that its longitudinal axis is always tangential to the record sound grooves. Referring now to Fig. 2, a pulley 7 is set up at point 4, this pulley being fixed and not free to rotate about its axis. An arm 1—4 is then pivoted at point 4, this arm being free to swing about this pivot which is the center point of pulley 7. At point 1 on arm 1—4 a further pulley 8 is mounted, this pulley being freely rotatable about point 1. Pulley 8 is so constructed that the diameter 9—10 thereof is twice the diameter 11—12 of pulley 7. The above-mentioned pulleys are connected by means of a wire or similar connection 13 this wire being fixed to the pulleys, and not free to slip relative thereto.

When the arm 1—4 is moved through an angle $\Delta$ to a new position 1′—4, pulley 7 moves with respect to the wire 13, through an angle 11—4—11′. Therefore, pulley 8 in its new position 8′ is rotated through an angle 15—1′—10′, and it can be shown geometrically that the angle 15—1′—10′, is one-half the angle $\Delta$. Hence, when arm 1—4 is considered to be a tone arm pivoted at 4, having a pick-up head mounted on pulley 8, the longitudinal axis of the head extending normal to the diameter 9—10, and having a needle contacting the record grooves at 1, then, as the tone arm swings through an angle $\Delta$ the head moves through an angle 15—1′—10′ which is one-half the angle Δ. The conditions of Fig. 1 are therefore fulfilled and the pick-up maintains a true tangent to the sound grooves of the record.

Fig. 3 shows the proposed assembly, arranged in accordance with the concept disclosed in connection with Figs. 1 and 2. Referring now to Fig. 3 tone arm 16 extends from point 4 to point 1', the arm being pivoted at point 4. A fixed pulley 7 is mounted at the pivoted end of arm 16 and controls the free pulley 8', the free pulley being mounted at the opposite end of arm 16, this control being effected by way of wire 13. The diameter of pulley 8' is twice that of 7, in accordance with the previous discussion. The turntable is centered at 1, and as the record revolves, the needle is constrained by the sound grooves to describe a locus shown as the arc 2. The pick-up head is mounted on pulley 8 with its horizontal axis extending along the line 3—1'. The present arrangement is such that as the tone arm rotates, the head is also rotated in such a manner that its longitudinal axis always passes through the point 3, and the plane of vibration of the needle always extends along the line 1—1' and is perpendicular to the sound grooves of the record. Therefore, the necessary conditions for distortionless reproduction are fulfilled.

It can be seen that a disadvantage of the above-described system is that it utilizes a wire to maintain the desired tangential relationship between the reproducer head and the record grooves. In accordance with the present invention, I provide a system in which rigid arms replace the wire, and in which the above-mentioned disadvantage is therefore obviated. It is apparent that the use of the two pivot points, of the previously-described systems, in a system using rigid arms does not accomplish the required result, as the feature of the gradual change in position of the points 11 and 12 of Fig. 2 is not realized in the usual system using pivoted, rigid arms. The system shown in Fig. 4, however, overcomes this by use of a cam arrangement which gradually shifts the pivot points, thereby giving rise to the desired relationship between the angular motion of the reproducer head and of the tone arm. Referring now to Fig. 4, the tone arm 16 is pivoted at 4, and has an arm 9—10 mounted at the free end thereof, this arm being pivoted at 1. The extremities 9 and 10 of arm 9—10 are coupled to pivot points 17 and 18 by rigid arms 19 and 20 respectively, pivot points 17 and 18 being movable, in a manner to be described. When the arm 16 takes up a new position 16', pivot points 17 and 18 are shifted to new positions 17' and 18' by a cam arrangement carried by the tone arm. This cam arrangement is described later in the discussion of the construction of Fig. 5. The pivot points 17 and 18 are shifted back and forth in the direction of the arrows, and the cam is so arranged that the rotation of arm 9—10 about point 1 to any position 9'—10' is such that when arm 9—10 is mounted normal to the longitudinal axis of the reproducer head, and the point 1 represents the center of the turntable, the reproducer head may be given the correct position for tangential tracking for any position of arm 16, which accomplishes the previously described desired result.

Figure 5:
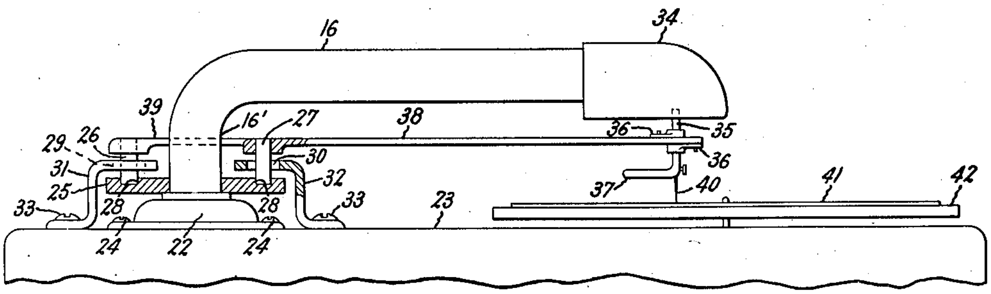

A possible construction of a tone arm which operates in accordance with the above-described system is shown in Fig. 5, where the arm 16 is mounted normal to shaft 16' which in turn is pivoted in swivel bearing 22, this bearing being fixed to chassis 23 by means of screws 24. Tone arm 16 carries, rigidly fixed thereto, a disc-like member 25 which acts as a cam for pivot members 26 and 27 which are carried in a slot 28 formed in member 25. Pivot members 26 and 27 are constrained to move in one plane only by means of slots 29 and 30 formed respectively in brackets 31 and 32, brackets 31 and 32 being mounted on chassis 23 by means of screws 33.

Tone arm 16 carries an end piece 34 at its free end, this end piece having a spindle 35 rotatably mounted thereon. Arm 36 is rigidly fixed to spindle 35 and the angular motion of this arm rotates the above-mentioned pin and hence pick-up head 37. The extremities of arm 36 are coupled to pivot members 26 and 27 respectively by a pair of rigid arms 38 and 39. Needle 40 mounted in head 37 contacts record 31, this record being carried by the usual turntable 42.

As the record 41 rotates and causes needle 40 to follow the sound grooves of the record, tone arm 16 is thereby caused to rotate about pivot 22. The angular movement of tone arm 16 causes disc-member 25 to rotate and the motion of 25 is translated to arm 36 by linkage arms 38 and 39. As previously described, the slot 28 in member 25 is so cammed that arm 36 and hence spindle 35 and head 37 are given such a motion, relative to the motion of the tone arm 16, that the longitudinal axis of head 37 is always disposed in a plane tangential to the record sound grooves and the plane of vibration of the needle is always perpendicular to these grooves.

Figure 6:
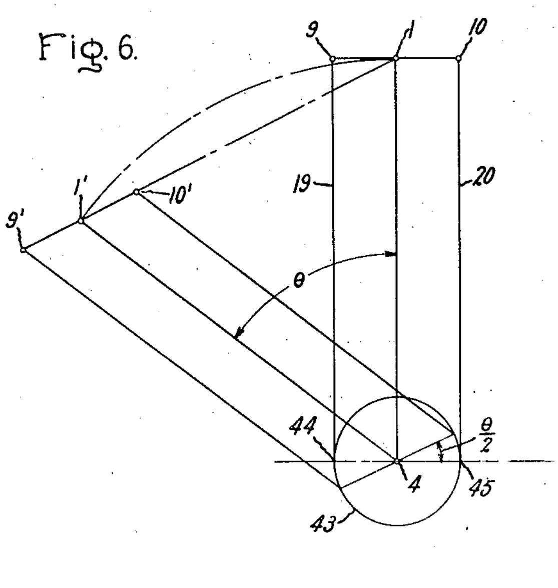

A modification of the invention is shown diagrammatically in Fig. 6 in which the tone arm is designated by line 4—1, this arm being pivoted at point 4. Tone arm 4—1 has a further arm 9—10 pivoted to its free end at 1, and the arm 9—10 is linked to a disc 43 by rigid arms 19 and 20. The diameter of disc 43 is equal to the length of arm 9—10. The arms 19 and 20 are pivoted at points 9 and 10 on arm 9—10, and also at points 44 and 45 on a disc 43. Disc 43 is geared to the tone arm, in a manner to be described, so that this disc is driven by the tone arm, as the latter rotates, at half its angular speed. Therefore, when tone arm 4—1 moves through an angle $\theta$ to a new position 4—1', disc 43 rotates through an angle $$\frac{\theta}{2}$$

It can be shown that when the reproducer head is mounted with its longitudinal axis normal to the arm 9—10, it is always tangential to the sound grooves of a record centered at 1, as the tone arm 4—1 revolves about the point 4.

Figure 7:
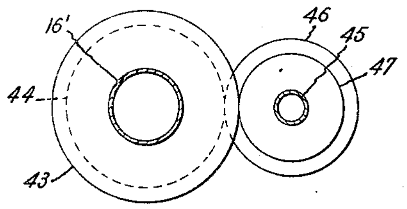
Figure 8:
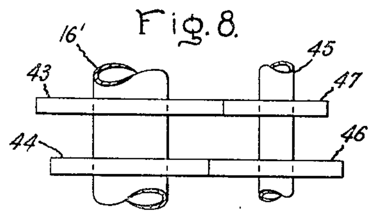

Figs. 7 and 8 show a plan and elevation view of the gearing means, whereby the tone arm may drive disc 43 at one-half its angular speed. In Figs. 7 and 8, shaft 16' of tone arm 16 has a pair of discs or wheels 43, 44 mounted thereon, disc 43 being rotatably mounted on shaft 16' and disc 44 being rigidly fixed thereto. A further idler shaft 45 is mounted adjacent to shaft 16' and carries a pair of discs 46 and 47 rigidly fixed thereto.

As shown in Fig. 5, when tone arm 16 is moved shaft 16' rotates and in the present case causes disc 44 to rotate which in turn by friction, or other means, drives disc 46. Shaft 45 is free to rotate and rotation of disc 46 causes this shaft and hence disc 47 to rotate. Disc 47 in turn drives the rotatably mounted disc 43, hence turning disc 43 in the same direction as shaft 16'. The various discs may be so proportioned that disc 43 turns at one-half the angular speed of shaft 16'. As shown in Fig. 6, rigid arms 19 and 20 are pivoted on disc 43, and hence the desired relative motion is imparted to the reproducer head, which may be mounted along the arm 9—10 in the manner shown in Fig. 5.

Figure 9:
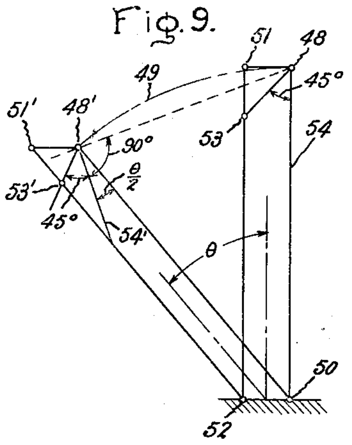

Yet another modification of the invention is shown diagrammatically in Fig. 9 in which the center of the turntable is designated at 48, and the needle point is driven along the arc 49. The tone arm is shown as 50—48 and is pivoted at point 50. A guide arm is represented as 51—52, and the guide arm is pivoted at point 52. The distance between the pivot points 50 and 52 is made equal to the length of the arm 51—48, arm 51—48 being pivoted at points 51 and 48. It can be seen, from parallelogram construction, that as the tone arm 50—48 is rotated to a new position 50—48', arm 51—48 in its new position 51'—48' is still parallel to the line joining pivot points 52 and 50. Point 53 is a fixed point on guide arm 52—51 and a further arm 48—53 pivots and slides at this point as the tone arm and guide arm rotates about the respective pivot points 50 and 52. The angle 53—48—54 is made equal to 45°, this angle being fixed for all positions of the tone arm.

When the tone arm swings through an angle $\theta$, and assumes a new position 50'—48', arm 48'—53' assumes a new length and remains at 45° to arm 48—54 in its new position 48'—54'. It can be shown that the arm 48—54 is turned an angle $$\frac{\theta}{2}$$

from the arm 48'—50 in its new position 48'—54'. Hence the arm 48—54 rotates about point 48 at half the angular speed of tone arm 50—48 and the previously described prerequisites for tangential tracking are fulfilled. Therefore, when the reproducer head is mounted with its longitudinal axis along the arm 48—54, its motion relative to the motion of the tone arm is such that its longitudinal axis is tangential to the sound grooves of a record centered at point 48 and the desired results are obtained.

Figure 10:
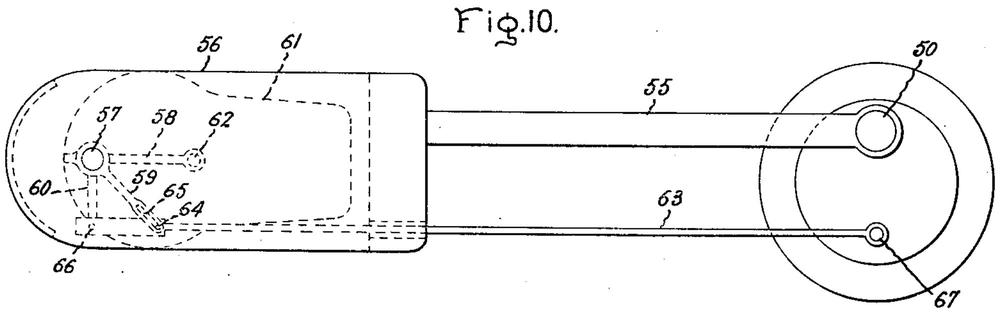
Figure 11:
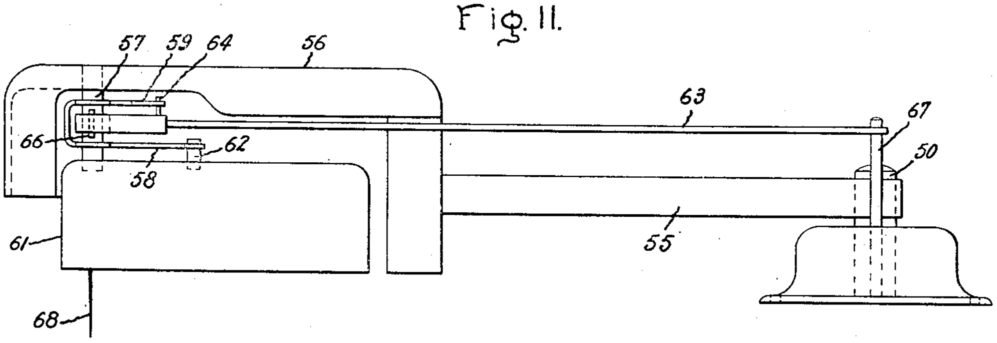

In Figs. 10 and 11 which show plan and elevation views of one construction of a tone arm in accordance with the principles discussed in connection with Fig. 9, tone arm 55 is pivoted at point 50 and carries tone head 56 at its free end. Head 56 has a stud 57 fixed thereto, arms 58, 59 and 60 being rotatably mounted on this stud. Stud 57 also carries a reproducer head 61 rotatably mounted thereon as shown. Arm 58 in a direction parallel to the longitudinal axis of the reproducing head links stud 57 to a further stud 62 mounted on head 61 and itself is fixed to arm 59 in such a manner that the angle therebetween is 45°, in accordance with the principles previously laid down in conjunction with Fig. 8. Arm 59 is slidably and rotatably attached to rigid arm 63 by means of stud 64 sliding in slot 65, this slot being formed in arm 59. Arm 60 is pivotally mounted on arm 63 by means of stud 66. Arm 63 is pivoted at point 67. Needle 68 is mounted in producer head 61 along the axis of stud 57.

As previously shown in Fig. 9, as tone arm 55 moves about pivot 50 it causes head 61 to move about pivot point 57. The last-described movement is effected by arm 59 in its motion with respect to arm 63. As the arm 59 is permanently fixed at an angle of 45° to arm 58, the motion of reproducer head 61 as the tone arm moves about its pivot point 50 is such that the longitudinal axis of the head is always tangential to the sound grooves of the record.

The invention therefore provides a tone arm having a movable reproducer head associated therewith, and provides linkage mechanism between the tone arm and the reproducer head, so arranged, that motion of the tone arm is transmitted to the head in such a way that the longitudinal axis of the head is always tangential to the sound grooves of the record, and the vibration of the needle is always in a plane normal to these sound grooves. With such an arrangement distortion in the reproduced sound and wear of the record are reduced to a minimum.

While certain embodiments have been shown and described, it will of course be understood that various modifications may be made without departing from the invention. The appended claims are therefore intended to cover any such modifications within the true spirit and scope of the invention.

What I claim as new and desire to secure by Letters Patent of the United States is:

1. A tone arm mechanism for use in devices for reproducing sound from records of the disc type, comprising, a member pivoted at a point, said member being capable of angular motion about said point, means including a stud member for mounting a reproducing head at the free end of said member, said stud member being substantially at one extremity of said head, a rigid arm member pivoted at a point adjacent said first-mentioned pivot point, a first arm member coupling the free end of said rigid arm member to said stud member and pivoted to the free end of said rigid member and to said stud member, a second arm member coupling said stud member to a further stud member, said further stud member being mounted on said head and said second arm being pivoted to said first-mentioned stud member and to said further stud member, a third arm member coupling said first-mentioned stud member to said rigid arm member, said third arm member being pivoted to said first-mentioned stud member and slidably and rotatably engaging a further stud member, said last-mentioned stud member being mounted on said rigid arm member, said third arm member being fixedly disposed at an angle substantially 45° to said second arm member, the arrangement being such that rotation of said first-mentioned member about said first-mentioned pivot point causes said reproducing head to rotate about said first-mentioned stud member at substantially half the angular speed of said first-mentioned member.

2. A tone arm mechanism for use in devices for reproducing sounds from records of the disc type comprising, a member pivoted at a point and arranged for angular motion about said point, a reproducing head rotatably mounted on said member at the free end thereof, a second member pivoted at a point adjacent said first-mentioned pivot point, an arm member connected between the free ends of said first and second members, a second arm member pivotally connected to said head and slidably connected to said second member at a point intermediate the pivoted and free ends thereof, and a third arm member rigidly connected to said second arm member and attached to said reproducing head at a point axially displaced from said rotatable mounting.

3. A tone arm mechanism for use in devices for reproducing sounds from records of the disc type comprising, a pair of substantially parallel members each pivoted at fixed spaced points, each of said members being capable of angular motion about said points, a reproducing head rotatably mounted upon the free end of one of said members, a rigid arm member pivotally connected to the free ends of both of said members, a second rigid arm member pivotally connected to the free end of said one member and slidably connected to the second of said members at a point intermediate the ends thereof, and a rigid connection between said second arm member and a point on said reproducing head spaced from the point of connection thereof to the free end of said one member.

GLEN E. GUY.

REFERENCES CITED

The following references are of record in the file of this patent:

UNITED STATES PATENTS

| Number | Name | Date |
|---|---|---|
| 1,349,636 | Swing | Aug. 17, 1920 |
| 1,438,642 | Graham | Dec. 12, 1922 |
| 1,963,673 | Patino | June 19, 1934 |

FOREIGN PATENTS

| Number | Country | Date |
|---|---|---|
| 300,704 | Great Britain | Nov. 12, 1928 |
| 728,245 | France | July 2, 1932 |
| 398,262 | Great Britain | Sept. 14, 1933 |
| 49,331 | Denmark | Oct. 1, 1933 |